United States Patent
Johansson et al.

(10) Patent No.: US 11,227,033 B2
(45) Date of Patent: Jan. 18, 2022

(54) EFFICIENT OBFUSCATION OF PROGRAM CONTROL FLOW

(71) Applicant: Telefonaktiebolaget LM Ericsson (publ), Stockholm (SE)

(72) Inventors: Björn Johansson, Bjärred (SE); Patrik Lantz, Dalby (SE); Michael Liljenstam, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 16/332,060

(22) PCT Filed: Jul. 25, 2017

(86) PCT No.: PCT/EP2017/068735
§ 371 (c)(1),
(2) Date: Mar. 11, 2019

(87) PCT Pub. No.: WO2018/050335
PCT Pub. Date: Mar. 22, 2018

(65) Prior Publication Data
US 2019/0228137 A1 Jul. 25, 2019

Related U.S. Application Data

(60) Provisional application No. 62/395,097, filed on Sep. 15, 2016.

(51) Int. Cl.
*G06F 21/14* (2013.01)
*G06F 21/60* (2013.01)

(52) U.S. Cl.
CPC ............ *G06F 21/14* (2013.01); *G06F 21/602* (2013.01)

(58) Field of Classification Search
CPC ............................... G06F 21/14; G06F 21/602
(Continued)

(56) References Cited

U.S. PATENT DOCUMENTS

2003/0093685 A1* 5/2003 Tobin .................... G06F 21/126
713/190
2008/0040593 A1* 2/2008 Kaabouch ............... G06F 21/77
712/244
(Continued)

FOREIGN PATENT DOCUMENTS

EP 3 057 021 A1 8/2016

OTHER PUBLICATIONS

International Search Report and Written Opinion of the International Searching Authority for PCT International Application No. PCT/EP2017/068735 dated Sep. 28, 2017.
(Continued)

*Primary Examiner* — Michael S McNally
(74) *Attorney, Agent, or Firm* — Sage Patent Group (57) ABSTRACT

An efficient obfuscation of program control flow, comprising obscuring a control execution flow through a plurality of code blocks of a computer program. It involves obtaining a secret key, initializing a state variable based on the secret key, generating a switching value by processing the state variable through an encoding function, and selecting a code block from among a set of code blocks using the switching value. It further involves executing the block code, which comprises updating the state variable based on a present value of the state variable, and repeating the steps of generating a switching value, selecting a code block, and executing the code block to control execution flow through the set of code blocks.

20 Claims, 8 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2010/0226494 | A1* | 9/2010 | Lynch | G06F 21/10 |
| | | | | 380/28 |
| 2015/0312042 | A1 | 10/2015 | Michiels et al. | |
| 2019/0243952 | A1* | 8/2019 | Dekker | H01L 27/0203 |

OTHER PUBLICATIONS

Jan Cappaert, "Code Obfuscation Techniques for Software Protection," Dissertation presented at Katholieke Universiteit Leuven, 126 pages, Apr. 1, 2012.

Cappaert et al., "A General Model for Hiding Control Flow," In Proceedings of the Tenth Annual ACM Workshop on Digital Rights Management, DRM '10, New York, NY, USA, pp. 35-42, 2010.

Chow et al., "An Approach to the Obfuscation of Control-Flow of Sequential Computer Programs," LNCS, vol. 2200, Springer, Berlin, Heidelberg, pp. 144-155, 2001.

Klimov et al., "A New Class of Invertible Mappings," LNCS, vol. 2523, pp. 470-483, 2003.

László et al., "Obfuscating C++ Programs Via Control Flow Flattening," Annales Univ Sci. Budapest, Sect. Comp. 30, pp. 3-19, 2009.

Junod et al., "Obfuscator—LLVM—Software Protection for the Masses," Proceedings of the IEEE/ACM 1st International Workshop on Software Protection, SPRO'15, Firenze, Italy, pp. 3-9. IEEE, 2015.

Wang et al., "Software Tamper Resistance: Obstructing Static Analysis of Programs," Technical report, Department of Computer Science, University of Virginia, Charlottesville, VA, USA, 18 pages, 2000.

Sharif et al., "Impeding Malware Analysis Using Conditional Code Obfuscation," In Proceedings of the 15th Annual Network and Distributed System Security Symposium, NDSS 2008. Internet Society, 13 pages, 2008.

Wang et al., "Linear Obfuscation to Combat Symbolic Execution," Springer Berlin Heidelberg, pp. 210-226, 2011.

Gabriel, "Quarkslab's blog: Deobfuscation: recovering an OLLVM-protected program," http://blog.quarkslab.com/deobfuscation-recovering-an-ollvm-protected-program.html, 2014.

Examination Report for Indian Patent Application No. 201917006226 dated Dec. 16, 2020, 6 pages.

Chandan Kumar Behera et al., "Different Obfuscation Techniques for Code Protection," 4th International Conference on Eco-friendly Computing and Communication Systems, Procedia Computer Science 70 (2015) pp. 757-763.

* cited by examiner

|  | assem. instr. | exec. time | key values | number unique permutations |
|---|---|---|---|---|
| LFSR | 8 | 180 | $N^2$ | $(N-1)*(N-1)/n$ |
| LFSR+addition | 10 | 224 | $N^2$ | $N(N-1)*(N-1)/n$ |
| Per. pol. linear | 6 | 135 | $N^2$ | $N^2/2$ |
| Per. pol. quad | 10 | 260 | $N^3$ | $N^3/8$ |
| T-function (2) | 9 | 180 | $N$ | $N/2$ |
| T-function (3) | 13 | 224 | $N^2$ | $N^2/4$ |
| RC4 shuffle | 20 | 423 | $N^2$ | $N^2$ |

*Fig. 10*

```
int f(char c) {
  int i = 1;
  int s = 0;
  while(i <= 100) {
    if (c == 'f') {
      s += 1;
    } else {
      s += 2;
    }
    i++;
  }
  return s;
} int main(int argc, char** argv) { int c = argv[1][0];
  int s = f(c);

return 0;
}
```

*Fig. 11*

```
int swVar; // dispatcher
char inputC; // input
int i;
int s;
int retval;

void f1() {
  i = 1;
  s = 0;
  swVar = 2;
} void f2() {
  if (i <= 100) {
    swVar = 3;
  } else {
    retval = s;   // return s;
    swVar = 100;  // exit dispatcher loop
  }
} void f3() {
  if (inputC == 'f') {
    s += 1;
  } else {
    s += 2;
  }
  i++;
  swVar = 2;
} void dispatcher() {
  swVar = 1;
  while (1) {
    switch (swVar) {
      case 1:
        f1();
        break;
      case 2:
        f2();
        break;
      case 3:
        f3();
        break;
      default:
        return;
    }
  }
} int f(char c) {
  inputC = c;
  dispatcher();
  return retval;
} int main(int argc, char** argv) {
  int c = argv[1][0];
  int s = f(c);

printf("%d\n", s);

return 0;
}
```

*Fig. 12*

```
void f3() {
  if (h(inputC + q) == K) {
    s += 1;
  } else {
    s += 2;
  }
  i++;
  swVar = 2;
}
```

EFFICIENT OBFUSCATION OF PROGRAM CONTROL FLOW

CROSS REFERENCE TO RELATED APPLICATION

This application is a 35 U.S.C. § 371 national stage application of PCT International Application No. PCT/EP2017/068735, filed on Jul. 25, 2017, which itself claims priority to U.S. Provisional Application No. 62/395,097 filed Sep. 15, 2016, the disclosure and content of both of which are incorporated herein by reference in their entireties.

TECHNICAL FIELD

The present disclosure relates to methods and operations by computers for obscuring control execution flow of code blocks of a computer program.

BACKGROUND

Figure 1:
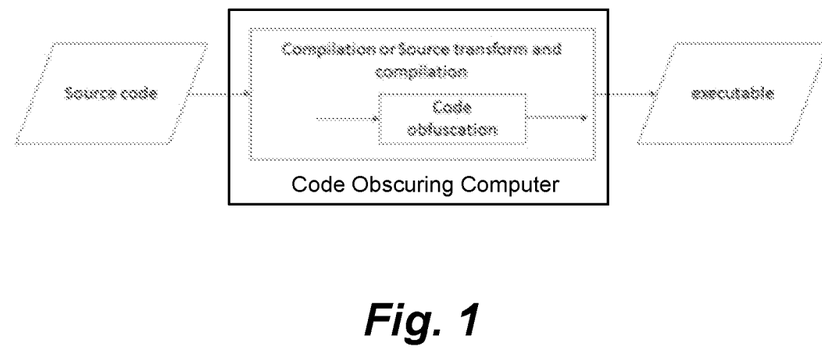
FIG. 1 illustrates a code obscuring computer that performs code obfuscation operations during compilation of source code and/or during transformation of source code.

A critical component of Digital Rights Management is being able to prevent unauthorized access to content or illegal copying of content. A combination of techniques is employed to prevent such access, and one important technique is code obfuscation which hinders reverse engineering of the code, modification of the code, and extraction of embedded keys, etc. FIG. 1 illustrates a code obscuring computer that performs code obfuscation operations during compilation of source code to output executable code or transformation of source code to transformed source code that is then compiled to output executable code. Different aspects of the code can be obfuscated, although the present disclosure is primarily directed to obfuscation of control execution flow through code blocks of a computer program.

Related art within this technical field is described in the document [1]-[9] below, which will be further discussed in the following:

[1] C. Wang, J. Hill, J. Knight, and J. Davidson. Software tamper resistance: Obstructing static analysis of programs. Technical report, Charlottesville, Va., USA, 2000.
[2] S. Chow, Y. Gu, H. Johnson, and V. A. Zakharov. An Approach to the Obfuscation of Control-Flow of Sequential Computer Programs, pages 144{155.Springer Berlin Heidelberg, Berlin, Heidelberg, 2001.
[3] T. Laszlo and A. Kiss. Obfuscating C++ programs via control flow flattening. Annales Univ. Sci. Budapest, pages 3-19, 2009.
[4] J. Cappaert and B. Preneel. A general model for hiding control flow. In Proceedings of the Tenth Annual ACM Workshop on Digital Rights Management, DRM '10, pages 35-42, New York, N.Y., USA, 2010. ACM.
[5] P. Junod, J. Rinaldini, J. Wehrli, and J. Michielin.Obfuscator-LLVM—software protection for the masses. In B. Wyseur, editor, Proceedings of the IEEE/ACM 1st International Workshop on Software Protection, SPRO'15, Firenze, Italy, May 19, 2015, pages 3-9. IEEE, 2015.
[6] A. Klimov; A. Shamir (2002). "A New Class of Invertible Mappings"
[7] F. Gabriel. "Quarkslab's blog: Deobfuscation: recovering an ollvm-protected program", http://blog.quarkslab.com/deobfuscation-recovering-an-ollvm-protected-program.html, 2014.
[8] M. Sharif, A. Lanzi, J. Giffin, and W. Lee. "Impeding malware analysis using conditional code obfuscation", In Proceedings of The 15th Annual Network and Distributed System Security Symposium, NDSS 2008. Internet Society, 2008.
[9] Z. Wang, J. Ming, C. Jia, and D. Gao, "Linear Obfuscation to Combat Symbolic Execution", pages 210-226. Springer Berlin Heidelberg, Berlin, Heidelberg, 2011.

The primary objective of obfuscation of control flow is to hide the program control flow from analysis. A known technique employed to perform obfuscation to hinder static analysis is control flow flattening, a concept that was first introduced in [1] and [2]. This involves breaking the computer program (source code) into many blocks, typically starting with all the basic code blocks, such as segments of sequential code that may end with, but do not contain, any transfer of control (jumps or calls) or conditional jumps. These basic code blocks may, optionally, be even further divided into further sub-blocks that will then also be basic code blocks. The resulting blocks should be randomly permuted, may be interspersed with segments of fake/dead code that will never be executed, and each resulting block is, in effect, turned into a small function with whatever bridging code needed to tie the blocks back together to provide a defined execution flow when the code blocks are executed by a computer. The sequencing and calling of the code blocks for program execution is performed by a new function termed the dispatcher function, which will, thus, encode the proper sequence of execution flow through the code blocks.

Figure 2A:
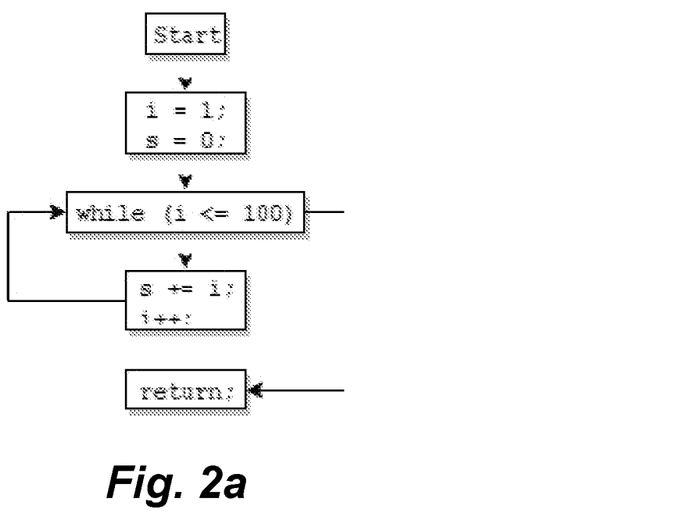
FIGS. 2a and 2b show an example operation of code flattening for a simple computer program.
Figure 2B:
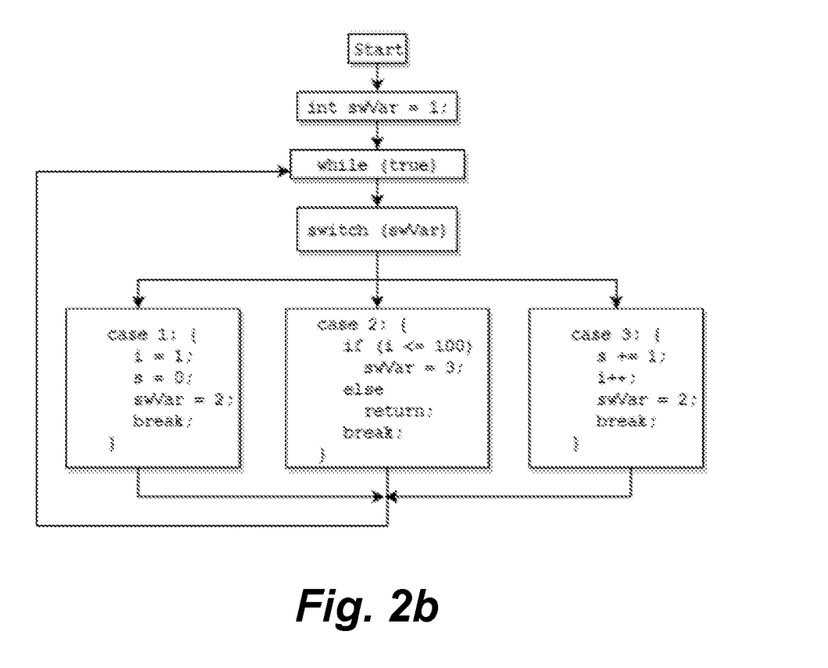

Control flow flattening obfuscation transforms sequential code blocks into a flattened structure, which can be a switch loop structure where each case statement represents a different one of the code blocks. In each code block the variable in the switch expression is updated to transfer execution flow to the next code block accordingly to the defined sequential structure. The last code block ends the switch loop by a return statement. FIGS. 2a and 2b show an example operation of code flattening for a simple computer program. FIG. 2a shows the original program, and FIG. 2b shows the flattened version after control flow flattening obfuscation has been performed to generate a plurality of code blocks (i.e., "case 1", "case 2", "case 3") from the original program. The basic code blocks have been broken into separate functions and a dispatcher function calls the basic blocks in sequence according to the original code. The dispatcher function includes the switch function "switch (swVar)" that selects among the code blocks based on a switch variable "swVar" which is defined during execution of each of the code blocks to point to the next code block to be selected by the switch function.

In this manner, for instance, loading compiled code into a disassembler that provides visualization through static analysis in the form of a control flow graph will not reveal the actual flow of control between the many pieces or what code may in fact be dead code. However, the obfuscation of control flow clearly still hinges upon it not being readily evident from the dispatcher function how the pieces are tied together during execution.

In the work by Wang et al. [1] and Chow et al. [2], the program is first transformed through control flow flattening, then additional measures were taken to make it difficult to determine the execution order of the basic blocks. Wang et al. based their approach on the use of pointers to determine indirect branch targets, and known NP-completeness results to determine aliasing of such pointers. Thus, through a reduction they show that branch target determination becomes an NP-complete problem. Chow et al., on the other hand, described a method for embedding a problem into the dispatcher function that controls the execution order of the flattened code blocks. By embedding a mechanism in such a way that finding a certain property of the mechanism is linked to a goal in deobfuscating the code, they provide a complexity-theoretic argument for the difficulty of the deobfuscation goal. Specifically, they embed a Linear Bounded Automaton (LBA), in the paper called a Linear Bounded Turing Machine, and reduce the acceptance problem of the LBA, to the problem of determining if a given code block will be executed or is dead code. In this manner, detection of dead code blocks is shown to be as hard as the LBA acceptance problem, a problem known to be PSPACE-complete. However, it has been mentioned that the guarantees thus provided are not quite what they seem, as we do not have average-case hard instance generators for NP-complete or PSPACE-complete problems.

In [3], an algorithm for flattening of C++ code is presented, but it does not address how to make the dispatcher function difficult to analyze. In [4] a cryptographic hash function is provided. A number of commercial and open source tools exist for code obfuscation, many of which perform some kind of control flow flattening. An open source example is the Obfuscator-LLVM tool [5].

In addition to static analysis, an adversary may use various forms of dynamic analysis to try to reconstruct the control execution flow through code blocks of a computer program. An example of dynamic analysis is tracing code flow during execution of a program. To try to hinder this, code obfuscation tools may employ various techniques to try to prevent debuggers being attached to the program (anti-debugging) and to detect if the program is being run in a virtualized environment (Virtual Machine (VM) detection). Another technique that may be attempted to analyze control flow through code blocks, see [7] as an example, is symbolic execution. Techniques such as those described in [8] and [9] have been proposed to hinder symbolic execution, but are both vulnerable to the adversary identifying and removing the particular constructs added to trap the analysis tools. Thus, there is a need to provide an improved obfuscation of the control execution flow through code blocks of a computer program.

SUMMARY

An object of the embodiments of the present disclosure is to address at least some of the issued outlined above, and this object and others are achieved by the method a computer according to the appended claims.

According to one aspect, embodiments are directed to a method by a computer to obscure a control execution flow through a plurality of code blocks of a computer program. The method includes obtaining a secret key, and initializing a state variable based on the secret key. The method further includes generating a switching value by processing the state variable through an encoding function, selecting a code block from among a set of code blocks using the switching value, and executing the code block which comprises updating the state variable based on a present value of the state variable. The steps of generating a switching value, selecting a code block, and executing the code block are repeated to control execution flow through the set of code blocks.

A potential advantage of these embodiments is that the execution flow through the code blocks is highly obscured and attempts to reverse engineering operation of the computer program may be prevented. During execution of each of the code blocks, the operations for updating the state variable and then processing the updated state variable through the encoding function to generate the switch value, makes it very difficult if not impossible to predict which code block should be executed next and to determine which code block was previously executed.

According to a second aspect, embodiments are directed to a code obscuring computer for obscuring a control execution flow through a plurality of code blocks of a computer program. The code obscuring computer includes at least one processor and at least one memory. The at least one memory is coupled to the at least one processor and stores obfuscation program code that when executed by the at least one processor causes the at least one processor to perform operations. The operations include obtaining a secret key, and initializing a state variable based on the secret key. The operations further include generating a switching value by processing the state variable through an encoding function, selecting a code block from among a set of code blocks using the switching value, and executing the code block which comprises updating the state variable based on a present value of the state variable. The steps of generating a switching value, selecting a code block, and executing the code block are repeated to control execution flow through the set of code blocks.

According to a third aspect, embodiments are directed to another code obscuring computer for obscuring a control execution flow through a plurality of code blocks of a computer program. The code obscuring computer includes: a secret key obtaining module for obtaining a secret key; a state variable initialization module for initializing a state variable based on the secret key; a switching value generating module for generating a switching value by processing the state variable through an encoding function; a code block selecting module for selecting a code block from among a set of code blocks using the switching value; a code block executing module for executing the code block which comprises updating the state variable based on a present value of the state variable; and a loop module for repeating operational execution of the switching value generating module, the code block selecting module, and the code block executing module to control execution flow through the set of code blocks.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Various embodiments of the present disclosure are directed to a method of creating permutations and encoding dispatcher state into a switching variable based on a combination of a secret key and a function dependent thereon which is used in a dispatcher of an obfuscation program to select among code blocks for execution. In one embodiment the dispatcher selects among a set of functions and/or configures the function differently, e.g., polynomial parameters thereof, based on the secret key. The secret key can be used to generate the specific functions within the families. In so doing, a single secret key may be used to generate multiple values, e.g., by dividing the secret key into several values, which are used as inputs in multiple places. In some embodiments the dispatcher uses a single secret key. In some other embodiments the dispatcher uses a plurality of secret keys.

The use of a secret key allows compact, computationally efficient, and storage efficient operational code to perform obfuscation of the control execution flow through code blocks of a computer program. The one or more functions used by the obfuscation program and which are dependent on the secret key, can be chosen to balance security properties and execution efficiency. This is in contrast to [4], where a secret input is combined with computationally burdensome functions like discrete logarithm problems or cryptographic hash functions, and which result in a long execution time on a host computer and performance degradation. In contrast to [4] using constructs to hinder dynamic analysis of the control flow through symbolic execution, some embodiments disclosed herein combine constructs with information about the dispatcher state to make it more difficult to remove the obstacle.

Various embodiments disclosed herein use a combination of a secret key and a computationally efficient function or set of computationally efficient functions by the obfuscation program to create permutations and to encode program state into a switching variable that is used to control selection of a next code block from among a set of code blocks of a computer program. The secret key is used to generate one or more specific functions used by the obfuscation program.

Figure 3:
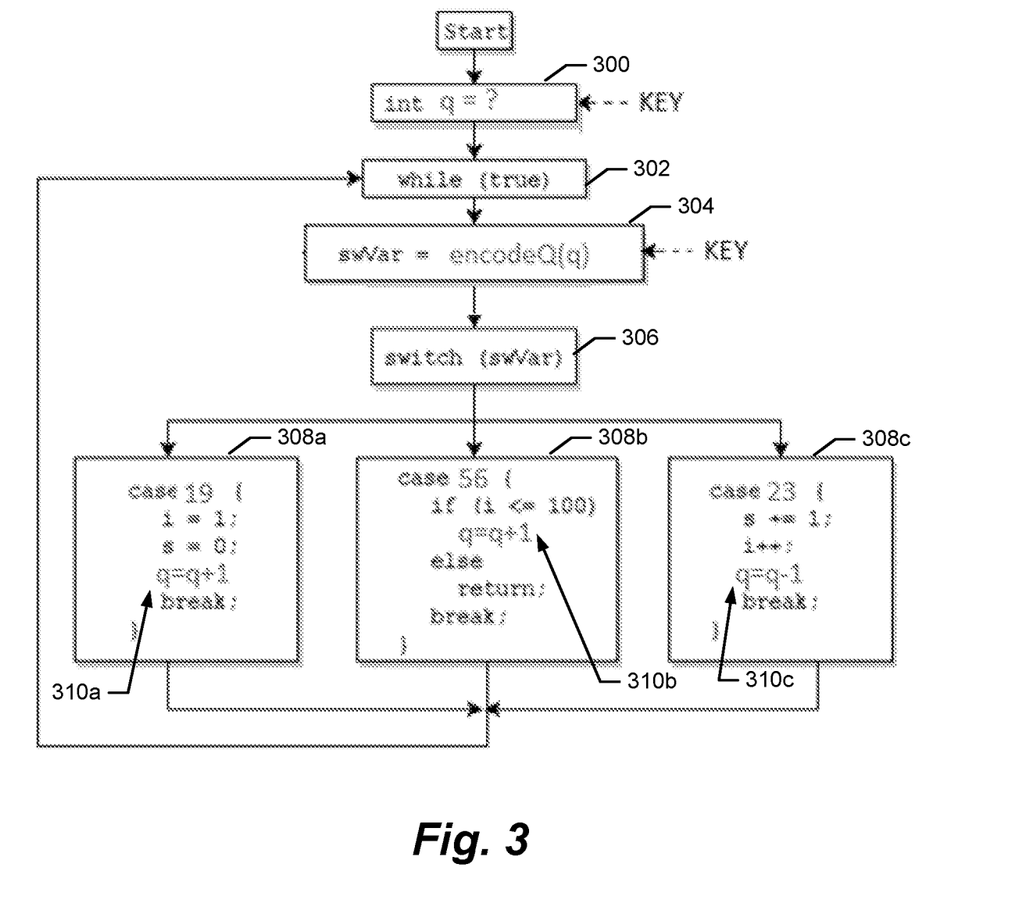
FIG. 3 illustrates an obfuscation program that uses an internal state variable q that is incremented and encoded to control the execution flow through a sequence of calls to different code blocks in accordance with some embodiments.
Figure 4:
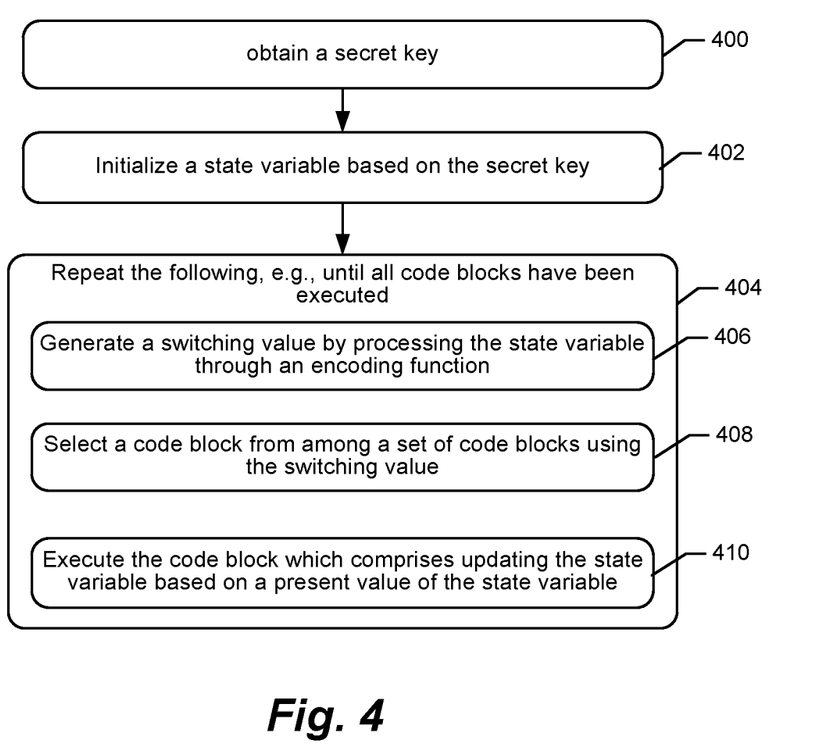
FIGS. 4-7 and 9 are flowcharts of operations and methods that can be performed by a code obscuring computer to obscure a control execution flow through a plurality of code blocks of a computer program in accordance with some embodiments.
Figure 5:
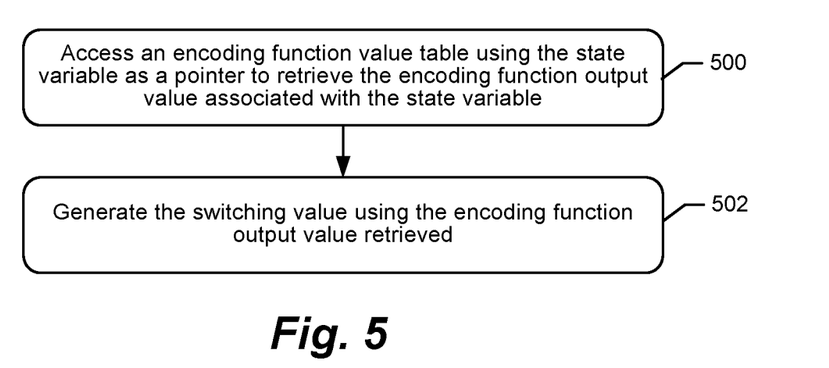
Figure 6:
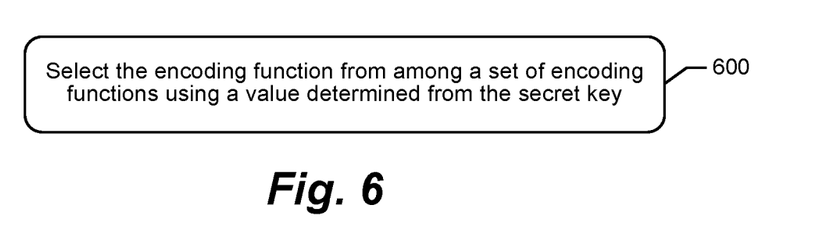
Figure 7:
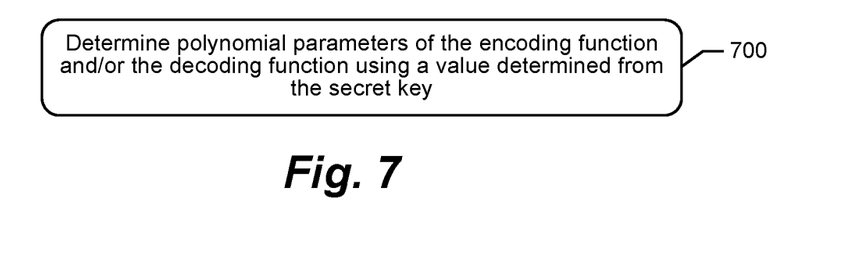

FIG. 3 illustrates an obfuscation program that uses an internal state variable q that is incremented (a computationally efficient operation) to control the execution flow through a sequence of calls to different code blocks 308a, 308b, and 308c (collectively "308a-c" and also called "case" statements). An encoding function "encodeQ( )" is used to translate from q to the switch variable "swVar." The encoding function can make it difficult or not possible for a computer tool or person to understand which state variable q results in the call of a certain case statement (e.g., cannot determine the "next code block" that should be called for execution according to a defined execution flow for the computer program to operate as intended by the developer), and also make it difficult to tell which q value resulted in a current switching value swVar (e.g., cannot determine the "previous code block" that was called).

In the embodiment of FIG. 3, the obfuscation program obtains a secret key "KEY" that is used to initialize (block 300) a state variable "q". The secret key may be obtained at runtime from, for example, another computer (e.g., data server) that is network accessible, a user input interface, a secure environment, white-box cryptographic operations, opaque predicates, etc. The program then repeats the subsequent operations of FIG. 3 while a loop condition is determined (block 302) to be true. The program generates (block 304) a switching value "swVar" by processing the state variable through an encoding function "encodeQ". The encoding function operates using a value determined from the secret key. For example, polynomial parameters of the encoding function may be determined using the value. The value may be the same value that was used to initialize (block 300) the state variable or may be another value that is determined from the secret key. A dispatcher function "switch(swVar)" selects (block 306) a code block from among a set of code blocks 308a-c using the switching value "swVar". The selected code block is executed which includes operations that update the state variable based on the present value of the state variable. For example, code blocks 308a and 308c each update the state variable by an increment of 1 (i.e., operations 310a and 310c). In contrast, code block 308b updates the state variable by an increment of −1 (i.e., operation 310b), or in other words decrements the state variable by 1.

Figure 8:
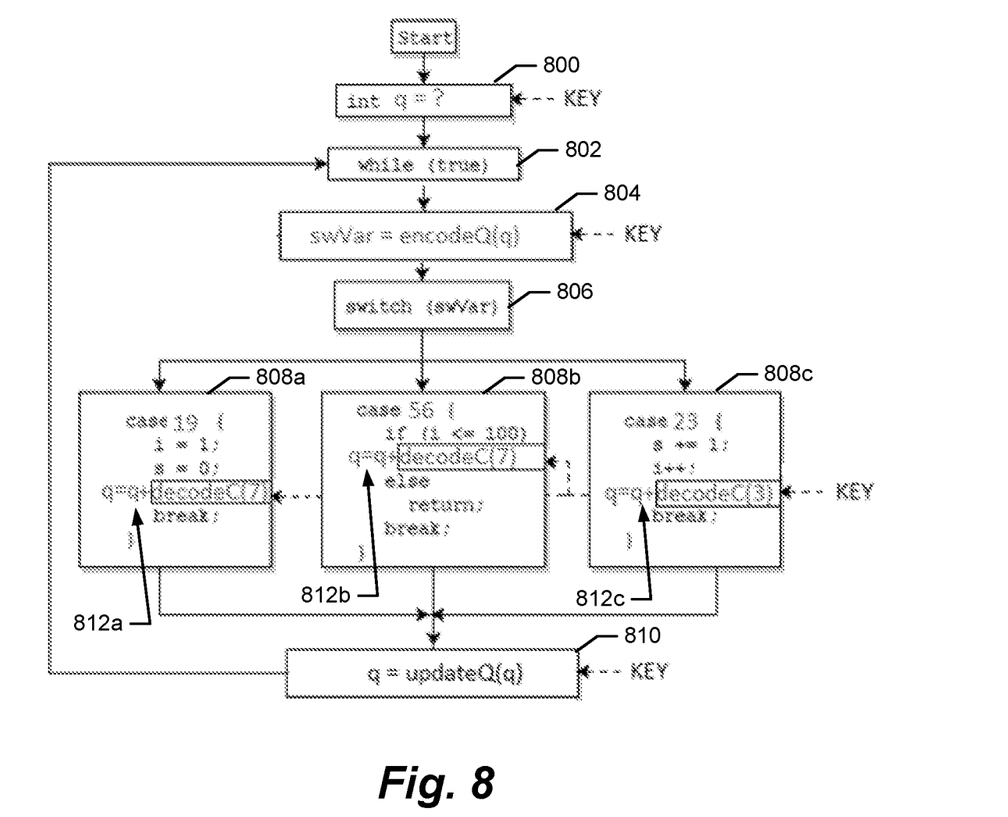
FIG. 8 illustrates another embodiment of an obfuscation program that controls the execution flow through a sequence of calls to different code blocks in accordance with some embodiments.
Figure 9:
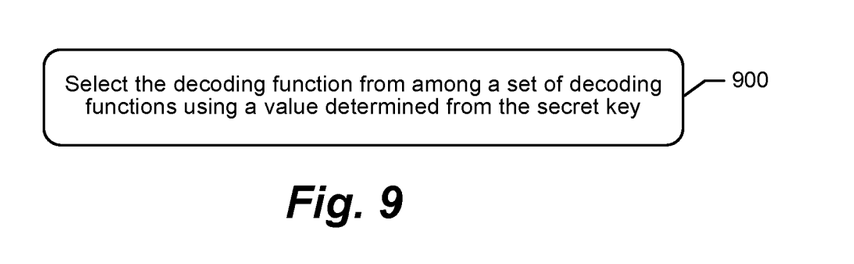

FIG. 8 illustrates another embodiment of an obfuscation program that exhibits some possible improvements over the program of FIG. 3 to make updates to the state variable q more difficult to follow by a decompiler computer or person. The use of a decoding functions decodeC( ) and a state update updateQ in the dispatcher, make it difficult to determine the next state variable q value or the previous state variable q value, if the present state variable q value is known (e.g., determined by tracing variable values during execution of the program). Performance requirements determine which permutations are used and which correspond to the identities, also whether the permutations are different or the same. These operations can improve the level of protection but become more computationally burdensome with an increase in the number of permutations that are used.

In the embodiment of FIG. 8, the obfuscation program obtains a secret key "KEY" that is used to initialize (block 800) a state variable "q". The program then repeats the subsequent operations of FIG. 8 while a loop condition is determined (block 802) to be true. The program generates (block 804) a switching value "swVar" by processing the state variable through an encoding function "encodeQ". The encoding function operates using a value determined from the secret key. For example, polynomial parameters of the encoding function may be determined using the value. The value may be the same value that was used to initialize (block 800) the state variable or may be another value that is determined from the secret key. A dispatcher function "switch(swVar)" selects (block 806) a code block from among a set of code blocks 808a-c using the switching value "swVar". The selected code block is executed which includes operations that update the state variable based on combining the present value of the state variable with an output of processing a defined value through a decoding function "decodeC( )", e.g., "q=q+decodeC( )". For example, code blocks 808a and 808b each update the state variable based on a result of processing the value 7 through the decoding function and combining the output thereof with the present value of the state variable (i.e., operations 812a and 812b). In contrast, code block 808c updates the state variable based on a result of processing the value 3 through the decoding function and combining the output thereof with the present value of the state variable (i.e., operation 812c). In a further embodiment, polynomial parameters of the decoding function are determined using a value determined from the secret key. The relationship between the updated state variable and the present state variable may be further obscured by processing (block 810) the updated state variable through an update function "updateQ" whose parameters, e.g., polynomical parameters, are determined based on a value determined from the secret key. The value used to define the update function "updateQ" may be the same as or different from one or more of the following: 1) the value used to define the decoding functions in blocks 808a-c; 2) the value used to define the encoding function in block 804; and 3) the value used to initialize the state variable in block 800.

Various more general methods and operations that may be performed by a computer to obscure a control execution flow through a plurality of code blocks of a computer program are now explained more generally with regard to the embodiments of the code listings shown in FIGS. 3 and 8 along with the embodiments illustrated by the flowcharts of FIGS. 4-7 and 9.

The methods and operations include obtaining (block 300 of FIG. 3, block 400 of FIG. 4, block 800) a secret key. The state variable is initialized (block 300, block 402, block 800) based on the secret key. A switching value is generated (block 304 of FIG. 3, block 406 of FIG. 4, block 804 of FIG. 8) by processing the state variable through an encoding function. A code block is selected (block 306 of FIG. 3, block 408 of FIG. 4, block 806 of FIG. 8) from among a set of code blocks using the switching value. The code block is executed (block 308a-c of FIG. 3, block 410 of FIG. 4, block 808a-c of FIG. 8) which includes updating the state variable based on a present value of the state variable. The steps of generating a switching value, selecting a code block, and executing the code block are repeating (block 302 of FIG. 3, block 404 of FIG. 4, block 802 of FIG. 8) to control execution flow through the set of code blocks.

In a further embodiment, the step of generating (block 304, block 406, block 804) the switching value by processing the state variable through the encoding function, includes accessing (block 500 of FIG. 5) an encoding function value table, which lists associated pairs of a state variable and an encoding function output value, using the state variable as a pointer to retrieve the encoding function output value associated with the state variable. The encoding function output values each correspond to a result of processing an associated one of the state variables through the encoding function. The switching value is then generated (block 502 of FIG. 5) using the encoding function output value retrieved.

In another embodiment, the step of generating (block 304, block 406, block 804) the switching value by processing the state variable through the encoding function, includes selecting (block 306, block 408, block 806) the encoding function from among a set of encoding functions using a value determined from the secret key.

In another embodiment, the step of selecting (306, 408, 806) the encoding function from among the set of encoding functions using the value determined from the secret key, includes selecting an encoding function value table from among a set of encoding function value tables using the value determined from the secret key. Each of the encoding function value tables lists associated pairs of a state variable and an encoding function output value. The encoding function output values each correspond to a result of processing an associated one of the state variables through an encoding function. The encoding function value tables in the set correspond to different encoding functions. The selected encoding function value table is then accessed using the state variable as a pointer to retrieve the encoding function output value associated with the state variable.

Using an encoding function value table can be the most computationally efficient way to implement the encoding function since the encoding function is repetitively invoked numerous times during execution of an obfuscation program for a lengthy computer program that has been flattened into many code blocks.

In another embodiment, the step of generating (304, 406, 804) the switching value by processing the state variable through the encoding function, includes determining (700 of FIG. 7) polynomial parameters of the encoding function using a value determined from the secret key, the polynomial parameters being used by a polynomial equation of the encoding function to process the state variable to generate the switching value. In another embodiment, the step of executing (308a-c, 410, 808a-c) the code block which comprises updating the state variable based on the present value of the state variable, includes updating the state variable by incrementing or decrementing (310a-310c) the present value of the state variable by a defined increment value. Referring to the embodiment of FIGS. 4, 7, 8 and 9, the step of executing (410, 808a-c) the code block which comprises updating the state variable based on the present value of the state variable, may include updating (block 808a-c of FIG. 8) the state variable based on combining the present value of the state variable with an output of processing a defined value through a decoding function. In a further embodiment, the step of updating (block 808a-c) the state variable may include determining (block 700 of FIG. 7) polynomial parameters of the decoding function using a value determined from the secret key, the polynomial parameters being used by a polynomial equation of the decoding function to process the state variable to generate the switching value. In an additional or alternative embodiment, the step of updating (block 808a-c) the state variable may include selecting (block 900 of FIG. 9) the decoding function from among a set of decoding functions using a value determined from the secret key. In still another additional or alternative embodiment, the step of updating (block 808a-c) the state variable may include determining polynomial parameters of a polynomial equation using a value determined from the secret key, and updating (808*a-c*) the state variable based on processing through the polynomial equation a result of combining the present value of the state variable with the output of processing the defined value through the decoding function.

In some embodiments, the step of generating (blocks 304, 406, 804) a switching value is based on a condition that results in the switching value being determined as a result of a one-way function performed on a value of the present state variable. The one-way function may be a cryptographic hash function and/or may use a linear expression having a mathematical conjecture. The one-way function may be based on the Discrete Logarithm Problem.

Thus, in accordance with at least some embodiments, one or more encoding functions or decoding functions are used make it much more difficult for a decompiler, program execution trace computer, or other technique to be used to determine the control execution flow through a computer program. Moreover, the obfuscation operations and methods may be performed with low resulting processor overhead and consuming minimal storage resources. Using complexity-theoretic arguments or hash algorithms for the functions, the state variable which is used to select among a number of code blocks needs to be represented using enough bits to make it difficult for an attacker to construct a look-up table for the dispatcher function, e.g. rainbow tables of the Hash algorithm. However, representing the state variable using more bits than necessary can result in increased obfuscation complexity for the dispatcher evaluation to overcome to correctly determine the control execution flow. By instead introducing one or more secret keys as inputs to the dispatcher, the operations can make it infeasible to construct look-up tables while still keeping the state representation sufficiently compact to be reasonably implemented. The secret parameters/keys can be obtained at runtime by, from a computer that is network accessible, a user input, a secure environment, white-box cryptographic operations, opaque predicates, etc, and are used in the above mentioned functions.

In general, a function that can create more different permutations will force the adversary to consider more possible combinations and make it more difficult to determine the control execution flow of code blocks of a computer program.

T-Functions:

In some embodiments the encoding function uses a T-function. In one embodiment, the following encoding function is used, $x'=x+(x^2 \text{ OR } C) \mod 2^n$ where C is 1 on bitposition 0 and 2. This encoding function has the property that it generates a single cycle state update which can be used to generate permutations. This encoding function contains both arithmetic and Boolean operations which complicates an attempted analysis of a computer program by obscuring the control execution flow through the code blocks of the computer program. The encoding function is also computationally efficient by only using about 4 computational operations for each cycle of generating a switching value by processing a state variable through the encoding function. Using the initial state and the variable C as the secret key this encoding function generates $N^2/4$ different permutations.

In order to generate more permutations, the above T-function can be extended with an additional unknown value D, provided in the encoding function as $x'=D \text{ XOR } (x+(x^2 \text{ OR } C)) \mod 2^n$ where C is 1 on position 0 and 2 and D is even. Obtaining D from a value determined from the secret key causes the encoding function to generate $N^3/8$ permutations at the computational overhead expense of one more operation.

The first T-function and the extended T-function shown above were expressed in terms of starting from a certain state and applying the defined algorithm to calculate the next state, and so on, to generate a particular permutation. This approach generates a single cycle permutation.

In an alternative embodiment, a permutation is generated is in terms of a function that can immediately compute a particular entry of a specific permutation by $p\_i=P(i)$, where $p\_i$ is the entry at position "i" in the permutation and P is a function. This approach is not restricted to generate single cycle permutations. This approach can be implemented according to different variant embodiments, starting from the first T-function. The resulting expression is $P(x)=x+(x^2 \text{ OR } a0)) \mod 2^n$ where a0 odd, which generate N/2 permutations for different choices of a0 and has 4 operations. A second expression is extended with more parameters, $P(x) = a0 \text{ XOR } (a1x+(x^2 \text{ OR } a2))) \mod 2^n$ where a1 odd and a2 odd. This expression generates $N^3/4$ unique permutations for different choices of ai and uses about 6 operations. The "a" series of values, i.e., "a0", "a1", "a2", "a1x", can be a value determined from the secret key (i.e., not known to an attacker attempting to determine the control execution flow).

Figure 10:
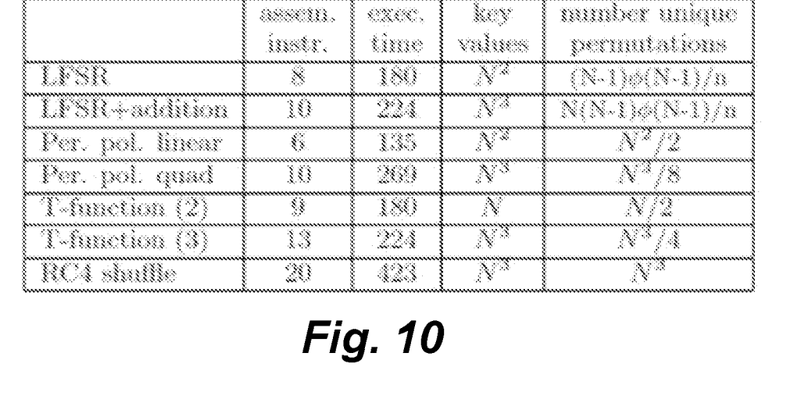
FIG. 10 is a table of various candidate permutation generation functions that can be used as an encoding function, decoding function, and/or update function in accordance with some embodiments.

For comparison, the table in FIG. 10 compares, for a plurality of different candidate permutation generation functions that can be used as an encoding function, decoding function, and/or update function disclosed herein, the following: the number of assembly instructions performed each permutation execution cycle; an estimate of the execution time for each permutation execution cycle; the number of key values available; and the number of resulting unique permutations. These candidate functions may be implemented directly in the dispatcher and used during execution of the flattened program. The candidate functions can include one or more of: a simple increment (Linear Feedback Shift Register (LFSR), a LSFR with an addition function, a Rivest Cipher 4 (RC4) shuffle function, a modular expression, a Linear Bounded Automaton (LBA) based on [2], a fast cryptographic hash function (hashes based on [4]), and a Discrete Logarithm Problem (DLP) based on [4].

In accordance with various embodiments, one or more T-functions can be used to perform the encoding function (e.g., 304 in FIG. 3, 812*a-c* in FIG. 8), the decoding function (e.g., 804 in FIG. 8), and/or the update function (e.g., 810 in FIG. 8).

Applications:

A flattened program may have one or more valid execution traces depending on the use-case. A valid execution trace occurs when, for example, the code blocks are executed in a sequence that was intended or permitted by the software developer so that the computer program performs as intended.

When a computer program has only one valid control execution flow (execution of the various code blocks must be performed in one defined order), obfuscation of the computer program using one or more embodiments herein can be used so that only if the valid flow is performed will a defined input to the computer program result in valid program operation and/or result in a valid output from the computer program. For example, the valid flow may provide verification of a valid license key that is input from a user input interface or from a license server. Software diversification can be performed to prevent reuse of the same license key in other instances of the same computer program (e.g., other instances of the computer program downloaded from a program installation server). Software diversification can be performed by either or both steps, 1) diversifying the code before flattening; and 2) diversification as part of flattening. Regarding step 2), each software instance may have a unique flattening and be given a unique license key which will cause the obfuscation program to execute the code blocks in the valid control execution flow, and any reuse of the unique license key for another instance of the computer program will cause the code blocks being executed in an invalid order and result in incorrect program operations, e.g., crash, and/or incorrect program output.

However, obfuscation of the computer program using one or more embodiments herein can also be used when a computer program has more than one valid control execution flow. A flattened program at a client computer may receive a challenge (e.g., secret key) from a server computer and execute the code blocks in the order caused by this challenge. Such computer program may include a remote software verification procedure in which the server supplies challenge values in the form of secret key which generate a response to the server computer. The server computer can use its knowledge of what valid response is expected to be received from the computer program, when executed using the challenge, to determine whether the computer program executed correctly. Similarly, if there are multiple valid challenge-response pairs, the server can provide new challenges every time the computer program is installed or executed, and thereby protect against replay attacks based on knowing which challenges have already been consumed for such verification.

Several programs may be embedded into one large binary and flattened structure. The secret key can be used to determine which program is executed.

Protection Against Dynamic Analysis:

Another embodiment combines static analysis of the control flow with dynamic analysis of the control flow. In the examples of FIGS. 2, 3, and 8, because the code blocks contain no branches dependent on outside input, it may be possible, although very difficult, to trace the control execution flow through the code blocks during their execution using a debugger (trace computer) to discover their execution order (e.g., assuming anti-debugging or virtual machine detection if implemented fails to prevent such tracing). However, for a more complex program with dependencies on external input and a more complex function this becomes more difficult as there are many paths to explore and many conditions to analyze. In this case, program analysis tools using symbolic execution may be useful to discover paths and conditions. As an example, the blog post [7] describes reverse engineering of ollvm's default control flow flattening using a symbolic execution tool.

However, techniques have also been proposed to hinder the use of symbolic execution to deobfuscate programs Sharif et al. [8] propose making conditions dependent on cryptographic hashes of program input to make it difficult for program analysis to solve constraints for the condition. Wang et al. [9] propose using unsolved mathematical conjectures to similarly introduce difficult to solve conditions. Either or both of these techniques could be used independently of the control flow obfuscation technique disclosed herein. However, both of these techniques are vulnerable to an attacker finding these "trap functions" and removing them by rewriting the condition into a simpler equivalent one. In the case of the hash functions, the attacker would need to determine the input and be able to execute the hash function to compute the constant for the equivalence. Similarly, for the construction based on the mathematical conjecture, the adversary can find the result by executing the loop in isolation and thus find the condition. Thus, in both cases, knowledge of the input and inspection of the code, with some offline execution of a program fragment may be sufficient to remove the obstacle to tracing control execution flow through the code blocks.

Figure 11:
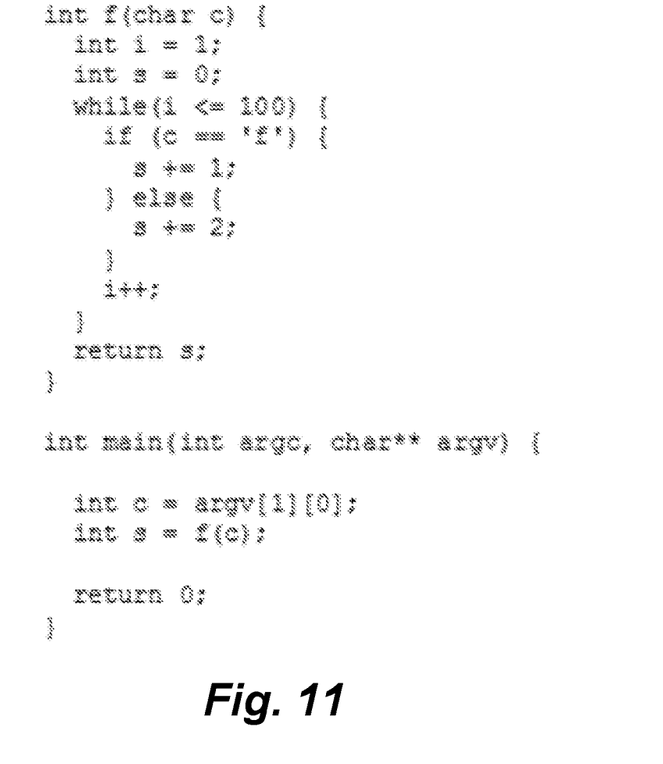
FIGS. 11-13 illustrate code flattening and execution flow obfuscation operations that can be performed by a code obfuscation computer in accordance with some embodiments.
Figure 12:
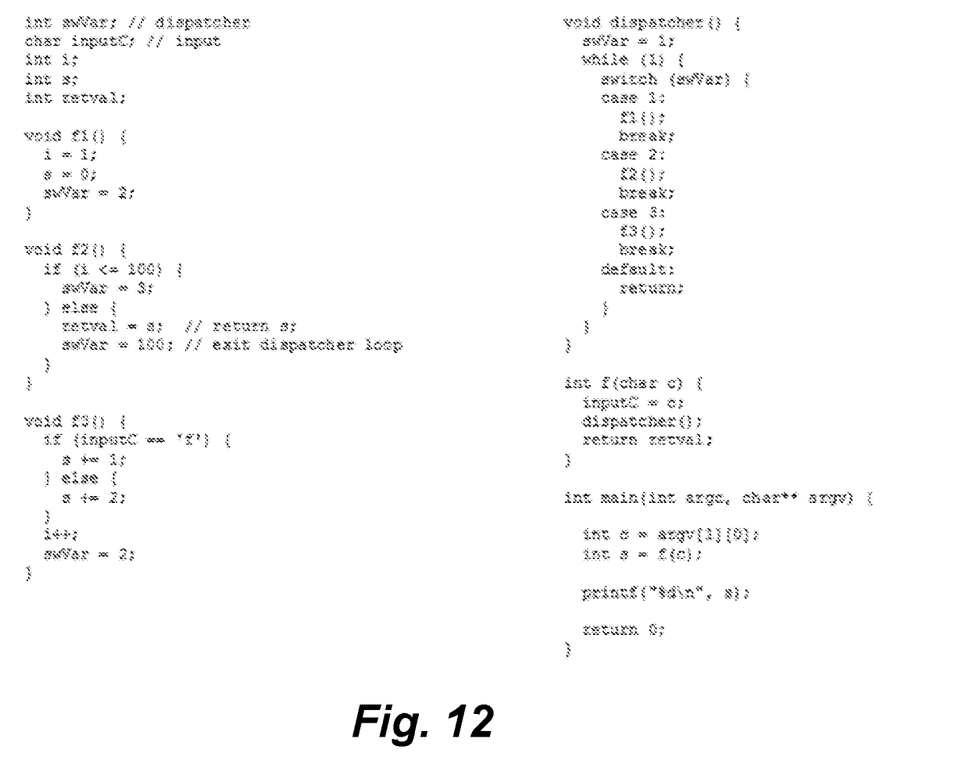
Figure 13:
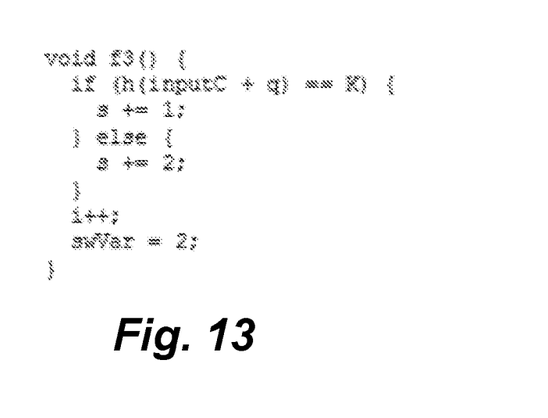

In accordance with another embodiment of the present disclosure, a branch condition is provided that is dependent on external input, such as the code listing shown in FIG. 11. A simple flattened version of the code listing of FIG. 11 is provided by the code listing in FIG. 12, with selection of code blocks being dependent on a input value "input". In order to hinder symbolic execution, and make it difficult for an adversary to remove the obstacle to tracking, the embodiment makes the condition also dependent on the state of the dispatcher state variable q, as shown by the obfuscation program listing in FIG. 13. Here the branch condition (code line 1300) includes a hash h of an expression including both the input and q, and the right hand side of the condition K is a constant that can be computed at compile time, since the state variable q and the original constant (here the character 'f') are both known. Since the value of the state variable q is not known by static inspection, the condition is made dependent on previous updates to the state variable q in other basic blocks. If not stopped by anti-debugging as discussed earlier, the adversary may still find the state variable q through dynamic analysis, for instance, by putting a breakpoint at the condition. But with multiple conditions and many branches this will be cumbersome as automatic exploration with symbolic execution will be hindered by each such obstacle and must be bypassed manually each time.

With reference to FIGS. 3, 4, 8, and 13, the step of generating (blocks 304, 406, 804) a switching value by processing the state variable through an encoding function, can include further generating the switching value based on a result of hashing (code line 1300) a combination of a value determined based on the secret key "inputC" and a present value of the state variable q. Making use of the state in the dispatcher when constructing obstacles for symbolic execution introduces extra dependencies that can make them more difficult to remove.

ADVANTAGES OF VARIOUS EMBODIMENTS

Operations and methods of the present disclosure may provide reductions in the processing overhead and memory storage requirements consumed to perform the operations and methods disclosed herein to obfuscate the control execution flow of a computer program, and may be at least as robust against attacks as previous approaches. Moreover protection against some dynamic analysis, specifically using symbolic execution, can be improved by making use of the dispatcher state which is dependent upon a secret key to complicate prediction of the previous state and next state.

Figure 14:
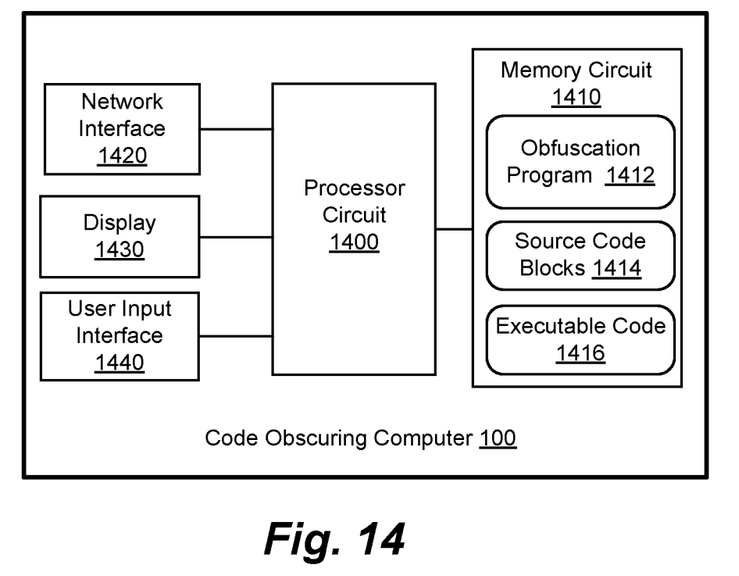
FIG. 14 is a block diagram of a code obscuring computer configured to perform operations in accordance with some embodiments.

Example of a Code Obscuring Computer:

FIG. 14 is a block diagram of an embodiment of a code obscuring computer 100 configured to perform operations according to one or more embodiments disclosed herein. The code obscuring computer 100 may be used to obscure the source code file of FIG. 1 during compilation of the source code to executable code, during source-to-source code transformation which may output the transformed source code or may then compile the transformed source code to executable code. Although various embodiments have been disclosed herein the context of processing source code, aspects of the present disclosure may also be used to process binary code, such as to perform binary-to-binary transformation that obscures the control flow there through.

The code obscuring computer 100 includes a processor circuit 1400 and a memory circuit 1410 containing obfuscation program code 1412, and may further contain source code blocks 1414 of a computer program that is processed by the obfuscation program code 1412 and/or may contain executable code 1416 generated based on an output of the obfuscation program code 1412. The code obscuring computer 100 may further include a network interface 1420 configured to communicate with other computers and/or a source code data storage device (e.g., network server) through a data network. The code obscuring computer 100 may further include a display device 1430 and a user input interface 740.

The processor circuit 1400 may include one or more data processing circuits, such as a general purpose and/or special purpose processor, e.g., microprocessor and/or digital signal processor. The processor circuit 1400 is configured to execute the obfuscation program code 1412 in the memory circuit 1410 to perform at least some of the operations described herein as being performed by a code obscuring computer.

Figure 15:
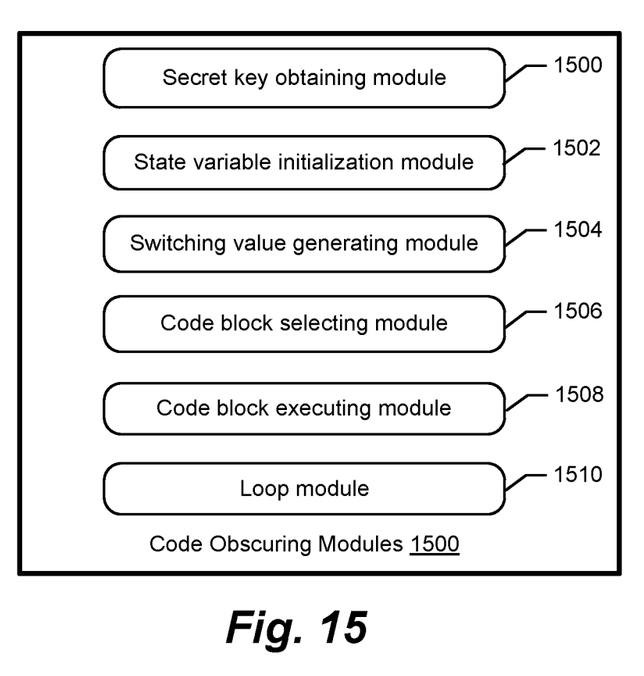
FIG. 15 illustrates code obscuring modules for a code obscuring computer that obscure a control execution flow through code blocks of a computer program configured in accordance with some embodiments.

Example of Code Obscuring Modules:

FIG. 15 illustrates embodiments of code obscuring modules 800 for a code obscuring computer that obscure a control execution flow through a plurality of code blocks of a computer program. The modules 1500 include a secret key obtaining module 1500, a state variable initialization module 1502, a switching value generating module 1504, a code block selecting module 1506, a code block executing module 1508, and a loop module 1510. The secret key obtaining module 1500 is configured for obtaining a secret key, e.g., based on one or more of the operations explained above for blocks 300, 400, and/or 800. The state variable initialization module 1502 is configured for initializing a state variable based on the secret key, e.g., based on one or more of the operations explained above for blocks 300, 400, and/or 800. The switching value generating module 1504 is configured for generating a switching value by processing the state variable through an encoding function, e.g., based on one or more of the operations explained above for blocks 304, 406, and/or 804. The code block selecting module 1506 is configured for selecting a code block from among a set of code blocks using the switching value, e.g., based on one or more of the operations explained above for blocks 306, 408, and/or 806. The code block executing module 1508 is configured for executing the code block which comprises updating the state variable based on a present value of the state variable, e.g., based on one or more of the operations explained above for blocks 308a-c, 410, 808a-c. The loop module 1510 is configured for repeating operational execution of the switching value generating module 1504, the code block selecting module 1506, and the code block executing module 1508 to control execution flow through the set of code blocks, e.g., based on one or more of the operations explained above for blocks 302, 404, and/or 802.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay). The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a computer to obscure a control execution flow through a plurality of code blocks of a computer program, the method comprising the steps of:
   obtaining a secret key;
   initializing a state variable based on the secret key;
   generating a switching value by processing the state variable through an encoding function;
   selecting a code block from among a set of code blocks using the switching value;
   executing the code block which comprises updating the state variable by incrementing or decrementing the present value of the state variable by a defined increment value or based on combining the present value of the state variable with an output of processing a defined value through a decoding function; and
   repeating the steps of generating a switching value, selecting a code block, and executing the code block to control execution flow through the set of code blocks.

2. The method of claim 1, wherein the step of generating the switching value by processing the state variable through the encoding function, comprises:
   accessing an encoding function value table, which lists associated pairs of a state variable and an encoding function output value, using the state variable as a pointer to retrieve the encoding function output value associated with the state variable, the encoding function output values each corresponding to a result of processing an associated one of the state variables through the encoding function; and
   generating the switching value using the encoding function output value retrieved.

3. The method of claim 1, wherein the step of generating the switching value by processing the state variable through the encoding function, comprises:
   selecting the encoding function from among a set of encoding functions using a value determined from the secret key.

4. The method of claim 3, wherein the step of selecting the encoding function from among the set of encoding functions using the value determined from the secret key, comprises:
   selecting an encoding function value table from among a set of encoding function value tables using the value determined from the secret key, wherein each of the encoding function value tables lists associated pairs of a state variable and an encoding function output value, the encoding function output values each corresponding to a result of processing an associated one of the state variables through an encoding function, and the encoding function value tables in the set corresponding to different encoding functions; and
   accessing the selected encoding function value table using the state variable as a pointer to retrieve the encoding function output value associated with the state variable.

5. The method of claim 1, wherein the step of generating the switching value by processing the state variable through the encoding function, comprises:
   determining polynomial parameters of the encoding function using a value determined from the secret key, the polynomial parameters being used by a polynomial equation of the encoding function to process the state variable to generate the switching value.

6. The method of claim 1, wherein the step of updating the state variable based on combining the present value of the state variable with the output of processing the defined value through the decoding function, comprises:
   determining polynomial parameters of the decoding function using a value determined from the secret key, the polynomial parameters being used by a polynomial equation of the decoding function to process the state variable to generate the switching value.

7. The method of claim 1, wherein the step of updating the state variable based on combining the present value of the state variable with the output of processing the defined value through the decoding function, comprises:
   selecting the decoding function from among a set of decoding functions using a value determined from the secret key.

8. The method of claim 1, wherein the step of updating the state variable based on combining the present value of the state variable with an output of processing a defined value through a decoding function, comprises:
  determining an update function using a value determined from the secret key; and
  updating the state variable based on processing through the update function a result of combining the present value of the state variable with the output of processing the defined value through the decoding function.

9. The method of claim 8, wherein the decoding function and/or the updating function is a T-function comprising arithmetic and Boolean operation.

10. The method of claim 1, wherein the encoding function is a T-function comprising arithmetic and Boolean operation.

11. A computer program product comprising a non-transitory computer readable medium storing program code that when executed by a processor of a computer causes the computer to perform operations comprising:
  obtaining a secret key;
  initializing a state variable based on the secret key;
  generating a switching value by processing the state variable through an encoding function;
  selecting a code block from among a set of code blocks using the switching value;
  executing the code block which comprises updating the state variable by incrementing or decrementing the present value of the state variable by a defined increment value or based on combining the present value of the state variable with an output of processing a defined value through a decoding function; and
  repeating the steps of generating a switching value, selecting a code block, and executing the code block to control execution flow through the set of code blocks.

12. A code obscuring computer for obscuring a control execution flow through a plurality of code blocks of a computer program, the code obscuring computer comprising:
  at least one processor and
  at least one memory coupled to the at least one processor and storing obfuscation program code that when executed by the at least one processor causes the at least one processor to perform operations comprising:
    obtaining a secret key;
    initializing a state variable based on the secret key;
    generating a switching value by processing the state variable through an encoding function;
    selecting a code block from among a set of code blocks using the switching value;
    executing the code block which comprises updating the state variable based on a present value of the state variable by incrementing or decrementing the present value of the state variable by a defined increment value or based on combining the present value of the state variable with an output of processing a defined value through a decoding function; and
    repeating the steps of generating a switching value, selecting a code block, and executing the code block to control execution flow through the set of code blocks.

13. The code obscuring computer of claim 12, wherein the operation of generating the switching value by processing the state variable through the encoding function, comprises:
  accessing an encoding function value table, which lists associated pairs of a state variable and an encoding function output value, using the state variable as a pointer to retrieve the encoding function output value associated with the state variable, the encoding function output values each corresponding to a result of processing an associated one of the state variables through the encoding function; and
  generating the switching value using the encoding function output value retrieved.

14. The code obscuring computer of claim 12, wherein the operation of generating the switching value by processing the state variable through the encoding function, comprises:
  selecting the encoding function from among a set of encoding functions using a value determined from the secret key.

15. The code obscuring computer of claim 14, wherein the operation of selecting the encoding function from among the set of encoding functions using the value determined from the secret key, comprises:
  selecting an encoding function value table from among a set of encoding function value tables using the value determined from the secret key, wherein each of the encoding function value tables lists associated pairs of a state variable and an encoding function output value, the encoding function output values each corresponding to a result of processing an associated one of the state variables through an encoding function, and the encoding function value tables in the set corresponding to different encoding functions; and
  accessing the selected encoding function value table using the state variable as a pointer to retrieve the encoding function output value associated with the state variable.

16. The code obscuring computer of claim 12, wherein the operation of generating the switching value by processing the state variable through the encoding function, comprises:
  determining polynomial parameters of the encoding function using a value determined from the secret key, the polynomial parameters being used by a polynomial equation of the encoding function to process the state variable to generate the switching value.

17. The code obscuring computer of claim 12, wherein the operation of updating the state variable based on combining the present value of the state variable with the output of processing the defined value through the decoding function, comprises:
  determining polynomial parameters of the decoding function using a value determined from the secret key, the polynomial parameters being used by a polynomial equation of the decoding function to process the state variable to generate the switching value.

18. The code obscuring computer of claim 12, wherein the operation of updating the state variable based on combining the present value of the state variable with the output of processing the defined value through the decoding function, comprises:
  selecting the decoding function from among a set of decoding functions using a value determined from the secret key.

19. The code obscuring computer of claim 12, wherein the operation of updating the state variable based on combining the present value of the state variable with an output of processing a defined value through a decoding function, comprises:
  determining an update function using a value determined from the secret key; and
  updating the state variable based on processing through the update function a result of combining the present value of the state variable with the output of processing the defined value through the decoding function.

20. The code obscuring computer of claim 19, wherein the decoding function and/or the updating function is a T-function comprising arithmetic and Boolean operation.

\* \* \* \* \*